(12) United States Patent
Sample et al.

(10) Patent No.: US 7,594,846 B2
(45) Date of Patent: Sep. 29, 2009

(54) ETCHED VENT SCREENS

(75) Inventors: Greg Sample, Newberg, OR (US);
Robert Gainer, Newberg, OR (US);
Brian Russell, Portland, OR (US)

(73) Assignee: InFocus Corporation, Wilsonville, OR (US)

( * ) Notice: Subject to any disclaimer, the term of this patent is extended or adjusted under 35 U.S.C. 154(b) by 1059 days.

(21) Appl. No.: 10/859,908

(22) Filed: Jun. 2, 2004

(65) Prior Publication Data
US 2005/0003753 A1  Jan. 6, 2005

Related U.S. Application Data

(60) Provisional application No. 60/475,353, filed on Jun. 2, 2003.

(51) Int. Cl.
*H05K 5/00* (2006.01)

(52) U.S. Cl. ...................... 454/184; 454/277

(58) Field of Classification Search ............... 454/184; 361/695, 696, 689, 690
See application file for complete search history.

(56) References Cited

U.S. PATENT DOCUMENTS

| | | | |
|---|---|---|---|
| 1,479,630 A | | 1/1924 | Sperry |
| 2,651,967 A | | 9/1953 | Thomas |
| 3,019,701 A | * | 2/1962 | Brueckner et al. ............. 353/61 |
| 3,920,323 A | * | 11/1975 | Nishitani ..................... 353/61 |
| 4,023,472 A | * | 5/1977 | Grunder et al. ............. 454/338 |
| 4,120,575 A | | 10/1978 | Bach |
| 4,509,681 A | * | 4/1985 | Kogut .......................... 237/53 |
| 4,739,396 A | | 4/1988 | Hyatt |
| 4,751,872 A | * | 6/1988 | Lawson, Jr. .................. 454/184 |
| 5,095,965 A | * | 3/1992 | Higashiyama ............... 160/133 |
| 5,282,114 A | * | 1/1994 | Stone .......................... 361/687 |
| 5,673,029 A | * | 9/1997 | Behl et al. ................... 340/635 |
| 5,876,105 A | | 3/1999 | Rodriquez, Jr. |
| 5,886,639 A | * | 3/1999 | Behl et al. ................... 340/635 |
| 5,927,386 A | * | 7/1999 | Lin ........................... 165/80.3 |
| 6,109,767 A | | 8/2000 | Rodriguez |
| 6,185,097 B1 | * | 2/2001 | Behl .......................... 361/695 |
| 6,319,116 B1 | * | 11/2001 | Behl .......................... 454/187 |
| 6,343,011 B1 | * | 1/2002 | Yu ............................ 361/695 |
| 6,364,492 B1 | | 4/2002 | Fujimori |
| 6,416,184 B1 | | 7/2002 | Arai |
| 6,442,024 B1 | * | 8/2002 | Shih .......................... 361/695 |
| 6,508,704 B1 | * | 1/2003 | Wilson ....................... 454/277 |
| 6,637,895 B2 | * | 10/2003 | Fujimori et al. ............. 353/119 |
| 6,665,181 B2 | * | 12/2003 | Tanaka et al. ............... 361/695 |
| 6,690,576 B2 | * | 2/2004 | Clements et al. ............. 361/695 |
| 6,793,343 B2 | * | 9/2004 | Nakano et al. ................ 353/61 |
| 6,864,602 B2 | | 3/2005 | Korenaga |
| 7,014,558 B2 | * | 3/2006 | Oh .............................. 454/184 |
| 7,086,740 B2 | * | 8/2006 | Sample et al. ................ 353/52 |
| 7,226,352 B2 | * | 6/2007 | Oh .............................. 454/184 |
| 2002/0021415 A1 | | 2/2002 | Fujimori et al. |

FOREIGN PATENT DOCUMENTS

CN  1310791  8/2001

* cited by examiner

*Primary Examiner*—Derek S Boles
(74) *Attorney, Agent, or Firm*—Alleman Hall McCoy Russell & Tuttle LLP

(57) ABSTRACT

A vent screen for an electronic device is provided. The vent screen may include a framework formed from an integral substrate, and a plurality of voids formed in the framework. Typically, the voids are formed by etching away portions of the substrate, and are separated from each another by a plurality of separators formed in the framework. The separators may have a width of less than 1 mm.

17 Claims, 8 Drawing Sheets

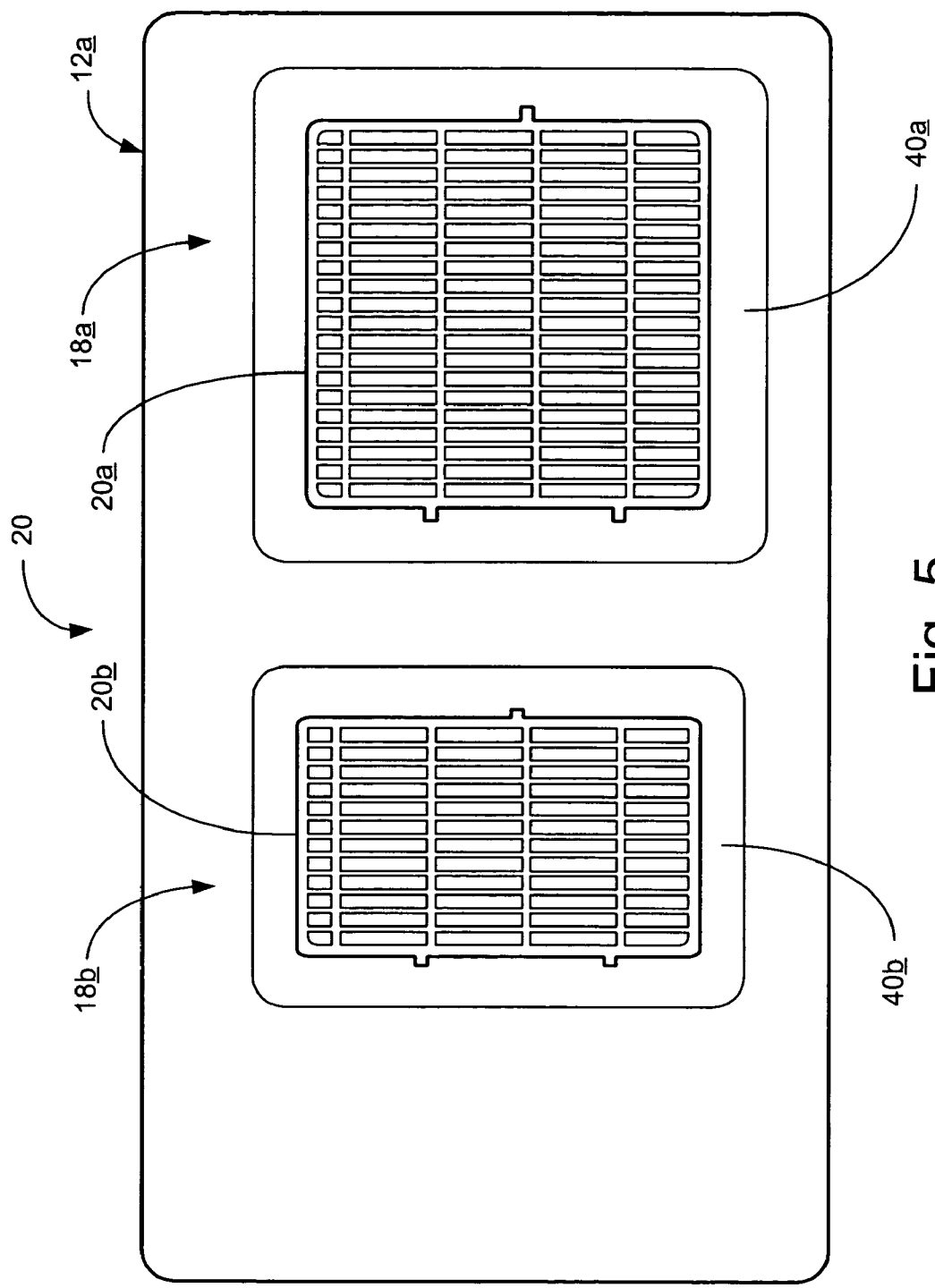

ETCHED VENT SCREENS

CROSS-REFERENCE TO RELATED APPLICATIONS

The present application claims priority under 35 U.S.C. § 119 to U.S. Provisional Patent Application Ser. No. 60/475,353, which was filed on Jun. 2, 2003. The disclosure of that application is hereby incorporated by reference in its entirety for all purposes.

TECHNICAL FIELD

The present invention relates generally to vent screens, and more specifically to etched vent screens that may be used in cooling systems of electrical devices such as projection devices, the etched vent screens typically having a plurality of voids formed in a framework by etching away portions of the framework.

BRIEF DESCRIPTION OF THE DRAWINGS

The disclosure is illustrated by way of example and not by way of limitation in the figures of the accompanying drawings, in which the like references indicate similar elements and in which:

FIG. 5 is a schematic view of the projection device of FIG. 1, showing airflow through inflow vents, blowers, and outflow vents having etched vent screens installed therein.

DETAILED DESCRIPTION

Figure 1:
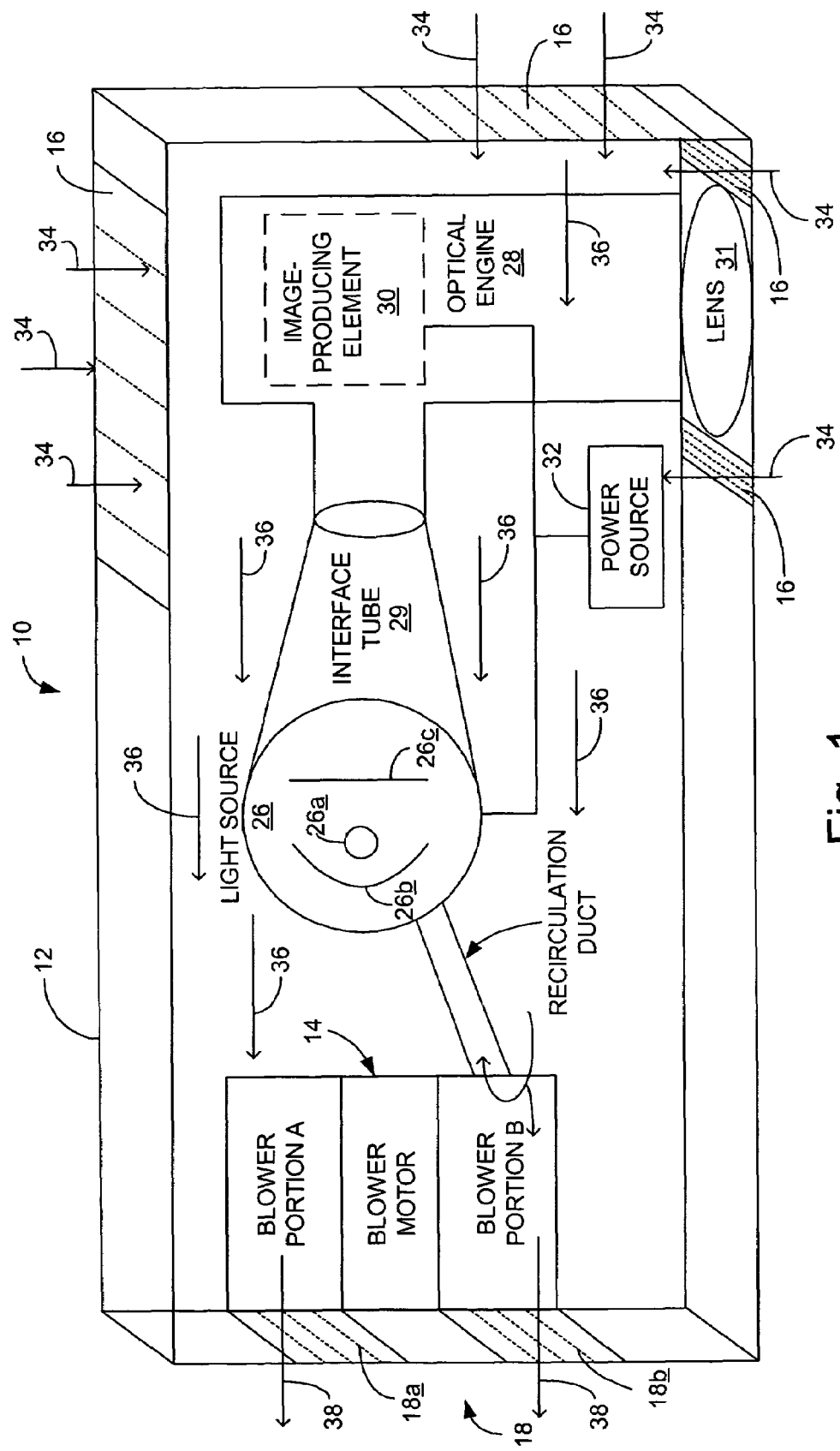
FIG. 1 is a schematic illustration of a projection device including etched vent screens, constructed according to an exemplary embodiment of the present invention.
Figure 8:
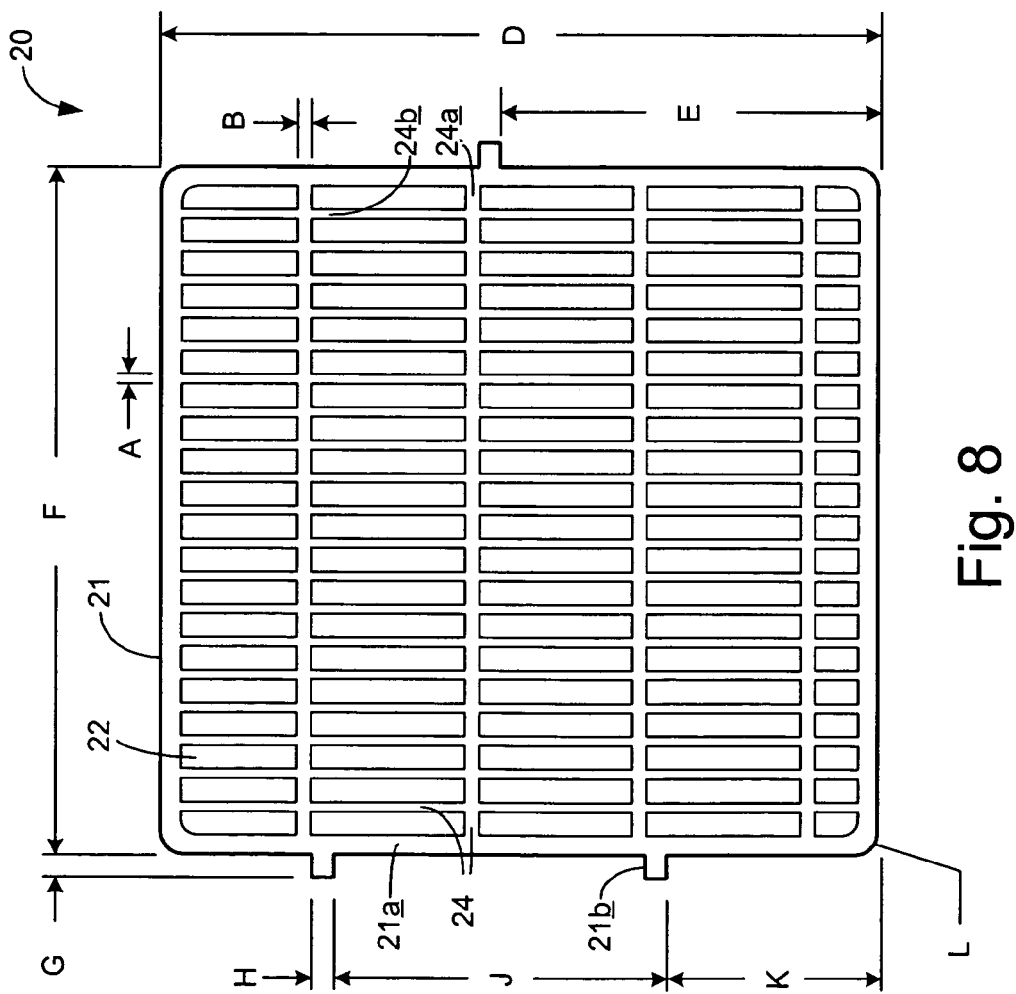
FIG. 8 is a plan view of an exemplary etched vent screen of the projector of FIG. 1.
Figure 10:
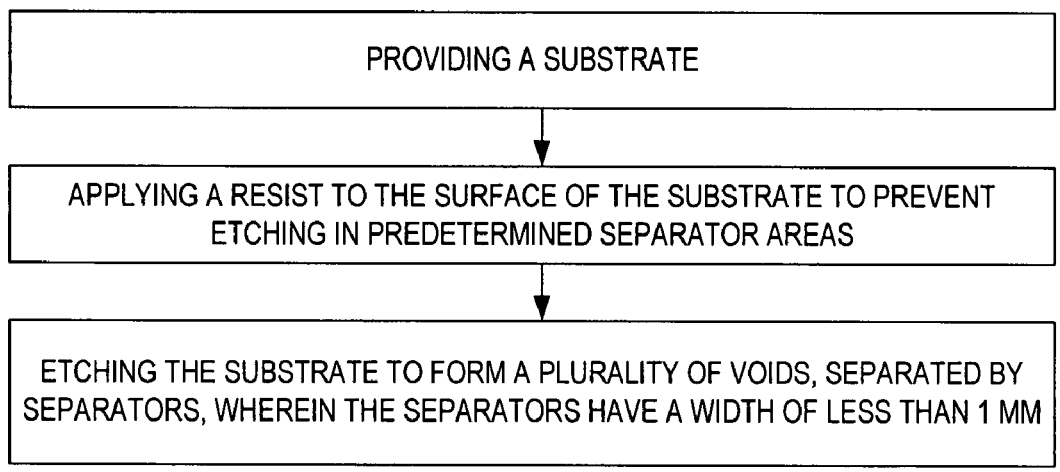
FIG. 10 shows a process flow for a method of forming a vent screen in accordance with the present disclosure.

An embodiment of an electronic device 10 is shown in FIG. 1. Electronic device 10 is typically a projection device 10 or other electronic device with heat-generating components that benefit from cooling by airflow through the device. Projection device 10 typically includes an enclosure 12 including a blower 14 configured to draw air in through one or more inflow vents 16 and to exhaust airflow out one or more outflow vents 18. As shown in FIG. 8, a vent screen 20 with etched voids 22 and separators 24 formed therebetween may be positioned in one or more vents 16, 18 of the enclosure to inhibit objects from penetrating the enclosure, while allowing for the passage of sufficient cooling airflow through the vent.

Projection device 10 is typically configured to project an image on a display surface, including, but not limited to, a screen, a wall, or other viewing surface or area. Examples of suitable devices for use as projection device 10 include digital projectors, liquid crystal display (LCD) projectors, and digital light processing projectors.

Projection device 10 typically includes a light source 26 and an optical engine 28, which may also be referred to as a light engine 28 or image engine 28. Light source 26 may be configured to produce a beam of light and project the light towards optical engine 28, which in turn is configured to generate an image. Light source 26 typically includes a lamp 26a positioned within a reflector 26b that is configured to direct most of the emitted light along the optical path of the system. Exemplary lamps include metal halide lamps and ultra-high-pressure (UHP) arc lamps, although virtually any suitable lamp may be used. The emitted light may also pass through one or more filters 26c, such as an infrared (IR) or ultraviolet (UV) filter, to filter out unwanted parts of the emission spectra of the lamp. Light produced from light source 26 may be channeled through an interface tube 29 (also referred to as a spacer 29) to optical engine 28.

Optical engine 28 typically includes an image-producing element 30. The image-producing element 30 may include any suitable image-generation device, such as a digital micromirror (DMD), an LCD panel, or any other suitable image source. Image-producing element 30 may be configured to project light toward one or more mirrors or other optical components, which, in turn, may be configured to reflect light toward a display surface. Optical engine 28 may also include one or more lenses 31, as well as filters, color wheels, mirrors, integrators, condensers, and other optical elements useful in the generation and projection of light images.

Projection device 10 typically includes one or more power sources 32. Power source 32 may be linked to the light source, the image-producing element, and other components, such as the power circuit board and control circuit board within the projection device.

As discussed above, various components of projection device 10 are heat-generating components, such as power supply 32 and lamp 26a. These heat-generating components may cause portions of the enclosure 12 to heat up during operation. If the temperature of the device exceeds critical limits, portions of the device may malfunction and/or exhibit a shorter life span. Controlling temperatures within the device such that they are maintained below critical limits may prevent the device from malfunctioning or requiring early replacement of parts.

Figure 2:
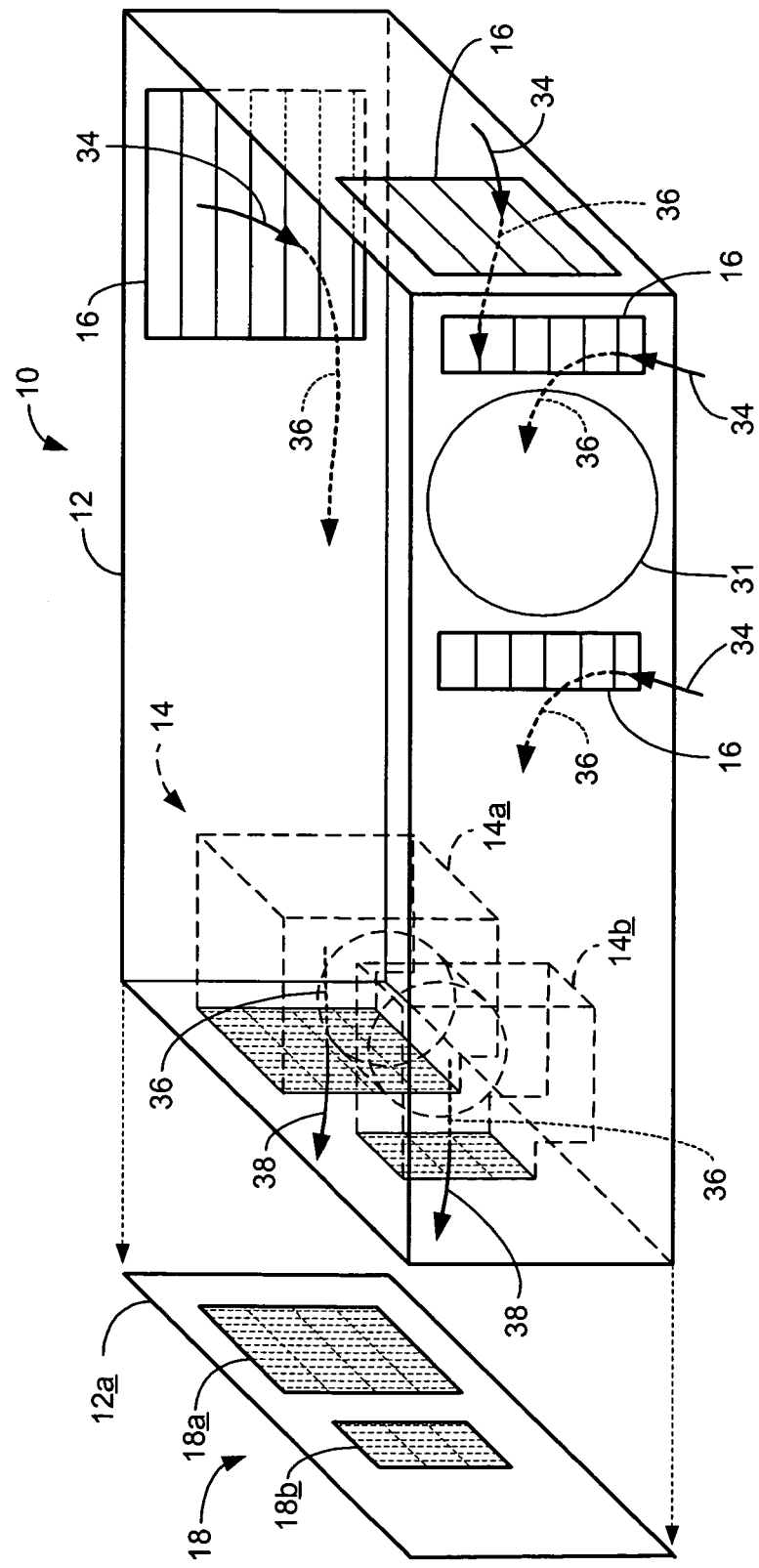
FIG. 2 is a partial cutaway isometric view of the projection device of FIG. 1, showing internal blowers and a removable panel with outflow vents.

To reduce the overall temperature of enclosure 12 and the components housed therein, projection device 10 typically includes an air-cooling system. The air-cooling system may include a blower 14 configured to draw inbound airflow, indicated by arrows 34, through one or more an inflow vents 16. The action of the blower induces internal airflow within the device, in the general direction of arrows 36, and further causes an exhaust airflow 38 to be vented out of one or more outflow vents 18. In this manner, the air-cooling system can enable ambient air to be circulated through the projection device and ejected, thus helping to cool projection device components. FIG. 2 shows exemplary configurations of inflow vents 16 and outflow vents 18, as well as airflows 34, 36, 38 through enclosure 12. It should be appreciated that the number and position of the inflow vents and outflow vents may vary.

Figure 3:
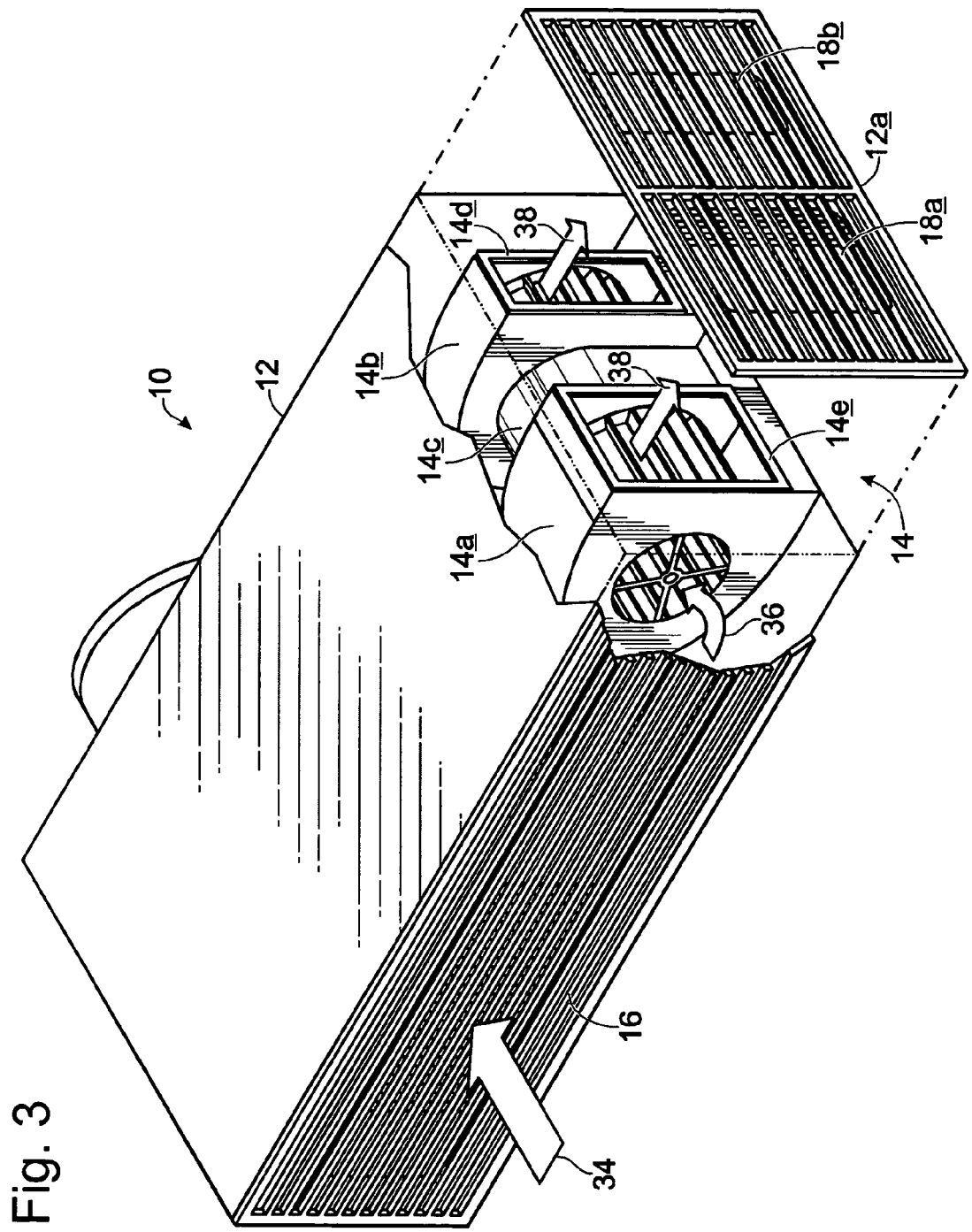
FIG. 3 is a front view of the removable panel of FIG. 2, showing etched vent screens installed in vents formed therein.

As shown in FIG. 3, blower 14 typically includes a pair of rotary fans 14a and 14b that are spaced apart and driven by a motor 14c. Rotary fans 14a, 14b are typically mounted adjacent a removable panel 12a of the enclosure 12, although alternatively they may be mounted at any suitable location within the device. For example, the rotary fans 14a, 14b may be mounted adjacent a top, bottom, or non-removable side panel of the device, or at a location spaced apart from the walls of the enclosure. While rotary blowers are shown in the depicted embodiments, it will be appreciated that other suitable blower types may also be used.

Figure 4:
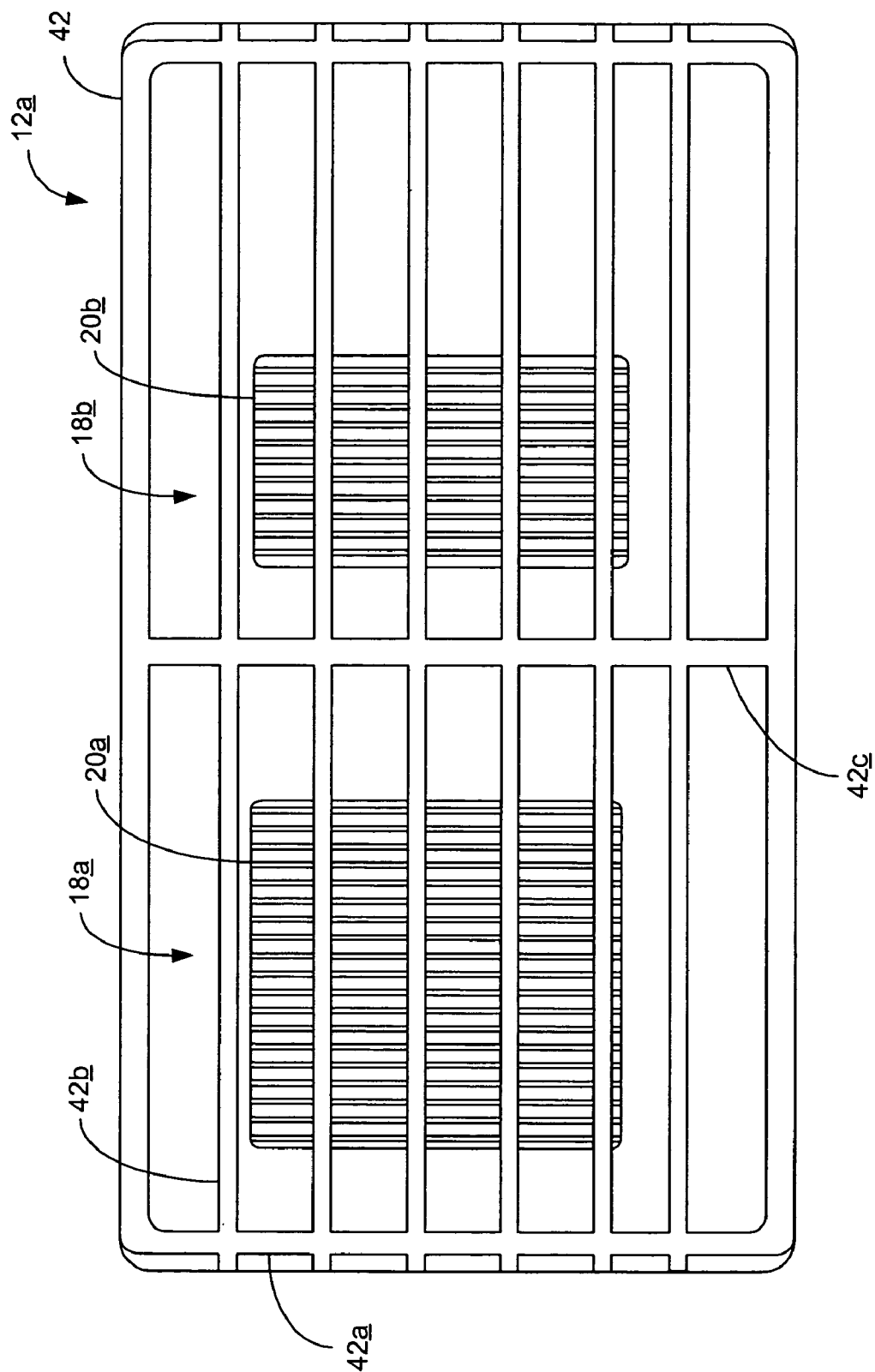
FIG. 4 is a back view of the removable panel FIG. 2, showing etched vent screens installed in vents formed therein.

Gaskets 14d, 14e may be respectively provided around an outlet on the exhaust side of the rotary fans 14a, 14b, to help inhibit leakage of air back into the enclosure from the interface between the fans 14a, 14b and the removable panel. As shown in FIG. 4, removable panel 12a may include recesses 40a, 40b shaped in manner that corresponds to the shape of gaskets 14d, 14e, such that a lip of the recesses fits around the gaskets when the removable panel 12a is attached to the enclosure 12, to inhibit air leakage.

As shown in FIGS. 4-5, removable panel 12a typically includes outflow vents 18a and 18b. A respective vent screen 20a, 20b is typically positioned within each of the outflow vents 18a, 18b. An outside side of the removable panel 12a typically includes a protective grill 42. Grill 42 may include an outer border member 42a, and one or more internal transverse or horizontal members 42b and longitudinal members 42c. Of course, grill 42 may alternatively take a variety of other suitable forms. Grill 42 is typically manufactured from plastic or another material with low thermal conductivity, to prevent hot surfaces from being exposed to user contact. To maximize airflow and increase the pleasing external appearance of the projector device 10, horizontal separator members 24a of vent screen 20 typically are substantially in alignment with the horizontal members 42b, relative to the direction of exhaust airflow 38 through the vent screen 20, and are thus hidden in FIG. 2.

Figure 6:
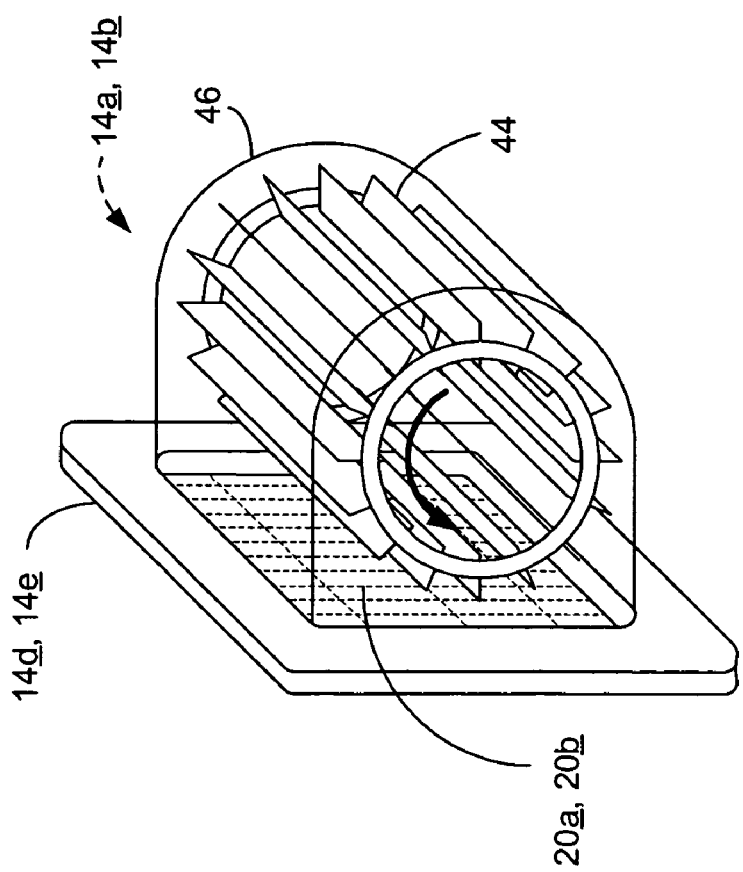
FIG. 6 is an isometric view of exemplary rotary fan of a blower of the projection device.
Figure 9:
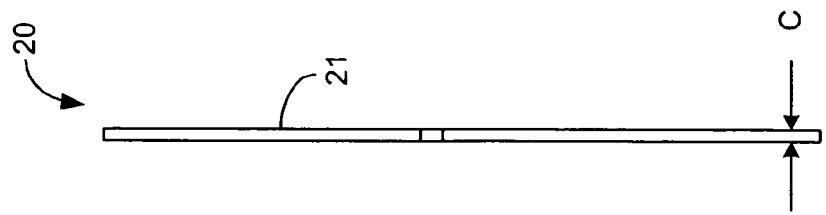
FIG. 9 is a side view of the etched vent screen of FIG. 8.

As shown in FIG. 6, rotary fans 14a, 14b typically include a circular fan blade assembly 44 mounted within a housing 46, the fan blade assembly being configured to rotate in a direction of rotation as indicated by an arrow in the Figure. Housing 46 typically includes gaskets 14d, 14e positioned on an exhaust side of the housing. Vents 20a, 20b are typically positioned adjacent the rotary fans when removable panel 12a is attached to enclosure 12. The fan blade assembly is typically configured to rotate about an axis of rotation 50 that is typically substantially parallel with an adjacent casing wall in which an outflow vent such as 18a, 18b is formed, such as removable panel 12a.

Figure 7:
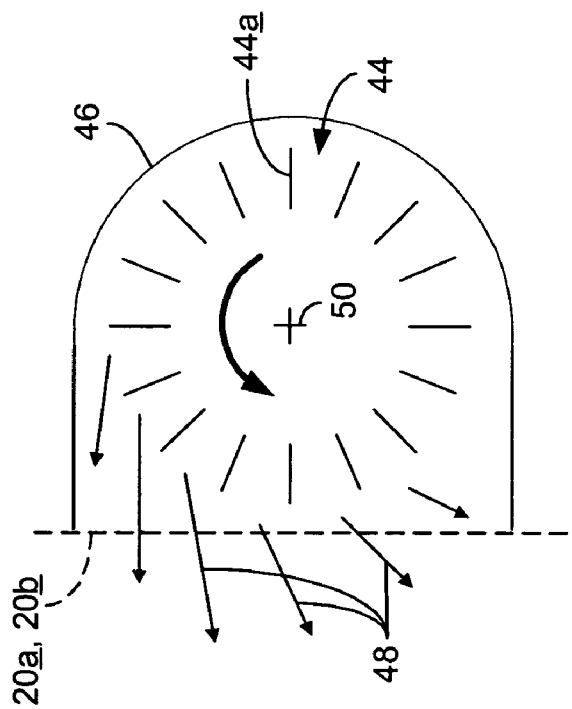
FIG. 7 is a schematic view showing diverging airflow from the blower passing through the vent screen of the projection device of FIG. 1.

As shown in FIG. 7, the fan is configured to blow the air in a divergent airflow pattern 48 through the vent screen 20a, 20b, as indicated by arrows. The field is referred to as divergent because its vectors diverge away from each other, or fan out, in directions tangential to the circumference of the blower wheel as they travel away from the blower through the vent screen. The divergence may be substantially radial in character or may curl, for example, around axis of rotation 50. Prior woven screens, which have a relatively large number of horizontal members, tend to block air that is flowing in a non-perpendicular direction relative to the screens. Thus, the voids in vent screen 20 are formed in an elongate shape with an elongate axis, and the elongate axis is oriented such that airflow is allowed to diverge as it travels through the void. Typically, the voids are oriented such that an elongate axis of the voids is substantially perpendicular to the axis of rotation 50 of the fan blade assembly. For rotary fans, the maximum divergence of the airflow may be in a plane that is substantially perpendicular to the axis of rotation 50. Thus, the maximum divergence of the airflow is allowed to travel through a cross section of the vent screen with a minimum number of horizontal members. Reducing the cross sectional area of horizontal members impeding the flow of air as it fans out from the blower, helps minimize the impedance caused by the horizontal members of the vent screen 20.

Some known projection devices include a metal-based wire mesh screen that may be positioned into outflow vents of a projection device to provide a screen for the outflow vent. However, such screens are often difficult to manufacture and secure in the projection device, as the individual metal strands that are woven to form the screen tend to come unwoven when the screen material is cut to smaller-sized pieces. To prevent a screen from becoming unwoven, the edges of the screen may be held in place by a frame that surrounds the screen. However, such frames also may be difficult to manufacture, and it may be difficult to transfer the cut screen into the frame without the metal strands becoming unwoven. Moreover, as described above, commercially available metal mesh screens may impede airflow to such an extent that adequate airflow to cool the projector device cannot be maintained through the projector device.

FIG. 8 shows an exemplary vent screen 20 constructed in accordance with an embodiment of the present invention. Vent screen 20 typically includes a framework 21 formed from an integral substrate. Vent screen 20 is typically formed from a relatively stiff etchable material with relatively high thermal conductivity. For example, vent screens 20 may be formed from stainless steel. The ventilation gaps or voids 22 in etched screens 20 may be formed by virtually any suitable etching process. For example, well-known etching processes utilizing a strong acid to form the gaps, and a resist material to preserve the steel in the areas adjacent the gaps, may be used.

Because screen vent 20 is formed from a single piece of metal, it does not require the cutting and framing steps that woven metal screens require. Furthermore, the screen 20 will not become unwoven during the manufacturing process, as is the tendency with commercially available woven metal screens. Thus, the use of vent screen 20 screen may greatly simplify a device manufacturing process.

Framework 21 typically includes an outer border member 21a and a plurality of voids 22 formed in the framework 21. Typically, the voids 22 may be formed by etching away portions of the substrate. Voids 22 are typically separated from each another by a plurality of separators formed in the framework between the voids. The separators may be of a variety of shapes, but typically include transverse or horizontal separators 24a and longitudinal or vertical separators 24b, which define a grid pattern of voids.

Because vent screens 20 are typically made from an etched sheet of metal, instead from woven strands of metal, ventilation voids 22 may be made to any desired shape and size. For example, ventilation voids 22 are typically formed in an elongate shape, along an elongate axis. Alternatively, voids 22 may take the form of a plurality of small round openings, or may have other shapes suitable for allowing the passage of airflow. Voids 22 may be sized to prevent objects of a predetermined size from falling through or penetrating into the enclosure. To comply with the U.L. standard for small, portable electronic devices, the gaps may be formed to have a width of no more than one millimeter where the length of the gaps is substantial, and where the separators have a desirably small width. The use of an etching process to form the voids 22 allows voids 22 with such a fine width to be easily formed.

Similarly, voids 22 may be separated by any suitable distance from adjacent voids 22. Generally, it is desirable to provide for as much airflow as possible through vent screens 20. Thus, it may be desirable to have relatively thin separators 24 separating adjacent voids 22. Using an etching process to form voids 22 may allow separators 24 of extremely thin proportions to be formed. Thus, the separators 24 may be formed to occupy less overall surface area than the overall effective surface area of voids 22. This helps to lessen the impedance of air flowing out of the projector. By way of example, the separators may have a width of less than 1 mm. Alternatively, the separators may have a width of between about 0.2 millimeters and 1 millimeter, and according to another alternative, the separators may have a width of between about 0.2 millimeters and 0.5 millimeters. These fine widths have the advantage of allowing increased airflow through the vents 18a, 18b.

As mentioned above, the U.L. requirements for ventilation screens may require that the screens prevent objects from being poked through the screen. Thus, vent screens 20 may have to withstand fairly vigorous probing tests. Because stainless steel is a relatively strong and stiff material, relatively long separators 24 may be able to withstand probing tests, even where the separators are extremely thin. However, the above described transverse separators 24a may be provided to reinforce longitudinal separators 24b if desired. While the depicted vent screens 20 include four transverse separators 24a, it will be appreciated that more or fewer such transverse separators 24a may be used.

The following are exemplary dimensions of the vent screen of FIG. 8. It will be understood that the depicted dimensions are merely illustrative, and that other desired dimensions may be used.

Exemplary Dimensions of Vent Screen 20:
A=0.2 mm
B=0.35 mm
C=0.25 mm
D=25.75 mm
E=13.68 mm
F=25.75 mm
G=0.75 mm
H=0.5 mm
J=12.05 mm
K=7.65 mm
L=1.63 mm radius FIG. 8 also illustrates that an outer frame or border 21a may be utilized around the perimeter of separators 24 and voids 22, if desired. The use of border 21a may help to stiffen and strengthen screen 20, and also may allow one or more retention tabs 21b to be used to hold screen 20 in place in removable panel 12a of projector 10. Each of these features may also be created during the etching process, allowing screens 20 to be installed in removable panel 12a without requiring any additional processing after etching. Finally, the use of stainless steel and etching processes to create screens 20 allow the screens to be colorized as desired using known techniques.

As discussed above, components of framework 21a, such as outer border 21a, transverse separators 24a, and longitudinal separators 24b, are formed by applying a resist to the surface of the metal sheet or sheets used to form vent screens 20 before etching the sheets. Thus, these components are typically formed integrally with one another from a single piece of material, and do not require any extra care or manufacturing steps to be assembled.

A method for forming the vent screen described herein typically includes providing a metal substrate, applying a resist to the surface of the metal substrates to prevent etching in predetermined separator areas, etching the metal to form a plurality of voids, separated by separators, wherein the separators have a width of less than 1 mm. The method may further include forming the vent screen to include the various other features described above, and installing the vent screen in a vent of a projector device, as described above.

Although the present exemplary embodiments illustrate the use of etched ventilation screens in a projection device, it should be appreciated that the etched vent screens described herein may be used in virtually any electronic device with heat generating components. Furthermore, while the etched vent screens are disclosed as being used in an outflow vent of a projector system, it should be appreciated that the vent screens may also be used as inflow vent screens where appropriate.

Furthermore, although the present disclosure includes specific embodiments, specific embodiments are not to be considered in a limiting sense, because numerous variations are possible. The subject matter of the present disclosure includes all novel and nonobvious combinations and subcombinations of the various elements, features, functions, and/or properties disclosed herein. The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of features, functions, elements, and/or properties may be claimed through amendment of the claims or through presentation of new claims in this or a related application. Such claims, whether broader, narrower, equal, or different in scope to the original claims, also are regarded as included within the subject matter of the inventions of the present disclosure.

What is claimed is:

1. A method of forming a vent screen, the method comprising:
    providing a metal substrate;
    applying a resist to the surface of the metal substrates to prevent etching in predetermined separator areas; and
    etching the metal to form a plurality of voids, separated by separators;
    wherein the separators have a width of less than 1 mm.

2. The method of claim 1, wherein the separators have a width of between about 0.2 millimeters and 1 millimeter.

3. The method of claim 2, wherein the separators have a width of between about 0.2 millimeters and 0.5 millimeters.

4. The method of claim 1, wherein the voids have a width 1 mm or less.

5. The method of claim 1, wherein the metal substrate is stainless steel.

6. The method of claim 1, wherein the voids in the vent screen are elongated.

7. The method of claim 6, wherein the voids in the vent screen are oriented such that as airflow passes through the vent screen the airflow diverges through the voids.

8. The method of claim 1, further including using the vent screen to form a removable panel of an enclosure of an electronic device.

9. The method of claim 8, wherein the electronic device includes a light source mounted within the enclosure and a lens configured to project light from the light source to a display surface.

10. The method of claim 8, further including positioning the vent screen in an inflow vent of the enclosure.

11. The method of claim 8, further including positioning the vent screen in an inflow vent of the enclosure.

12. The method of claim 10, further including drawing air into the enclosure through the inflow vent and blowing air out of an outflow vent.

13. The method of claim 12, further including drawing air into the enclosure through the inflow vent and blowing air out of the outflow vent using a blower positioned in the enclosure.

14. The method of claim 13, wherein the blower is a rotary blower including an axis of rotation.

15. The method of claim 13, wherein the blower includes a gasket formed on an exhaust side of the blower, the gasket being configured to inhibit leakage of exhaust airflow from the exhaust side of the blower back into the enclosure.

16. The method of claim 15, wherein the enclosure includes a lip configured to mate with the gasket.

17. The method of claim 16, wherein the lip is mounted on a removable panel of the enclosure.

* * * * *

UNITED STATES PATENT AND TRADEMARK OFFICE
CERTIFICATE OF CORRECTION

PATENT NO.         : 7,594,846 B2                                                Page 1 of 1
APPLICATION NO. : 10/859908
DATED              : September 29, 2009
INVENTOR(S)        : Sample et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1441 days.

Signed and Sealed this

Fourteenth Day of December, 2010

David J. Kappos
*Director of the United States Patent and Trademark Office*